United States Patent [19]

Mallik

[11] Patent Number: 5,142,383
[45] Date of Patent: Aug. 25, 1992

[54] HOLOGRAMS WITH DISCONTINUOUS METALLIZATION INCLUDING ALPHA-NUMERIC SHAPES

[75] Inventor: Donald W. Mallik, North Tarrytown, N.Y.

[73] Assignee: American Banknote Holographics, Inc., Elmsford, N.Y.

[21] Appl. No.: 678,747

[22] Filed: Apr. 1, 1991

Related U.S. Application Data

[62] Division of Ser. No. 470,121, Jan. 25, 1990, Pat. No. 5,044,707.

[51] Int. Cl.⁵ .................. G02B 5/18; G03H 1/02; B44F 1/12; B42D 15/00
[52] U.S. Cl. ............................ 359/2; 283/86; 283/91; 356/71; 359/572
[58] Field of Search ............... 350/3.6, 3.78, 162.23; 283/86, 904, 91; 356/71; 359/2, 567, 572

[56] References Cited

U.S. PATENT DOCUMENTS

| | | | |
|---|---|---|---|
| 4,034,211 | 7/1977 | Horst et al. | 350/162.23 |
| 4,568,141 | 2/1986 | Antes | 350/162.23 |
| 4,576,439 | 3/1986 | Gale et al. | 350/162.23 |
| 4,662,653 | 5/1987 | Greenaway | 350/162.23 |
| 4,685,138 | 8/1987 | Antes et al. | 350/162.23 |
| 4,892,385 | 1/1990 | Webster, Jr. et al. | 350/162.23 |

*Primary Examiner*—Bruce Y. Arnold
*Assistant Examiner*—Martin Lerner
*Attorney, Agent, or Firm*—Majestic, Parsons, Siebert & Hsue

[57] ABSTRACT

Non-continuous reflective hologram or diffraction grating devices are provided in various forms for authenticating documents and things, such as those that contain visual information desired to be protected from alteration. Examples of such information include written personal data and photograph on a passport, driver's license, identity card, transportation pass, and the like. The reflective discontinuous hologram or diffraction device is formed in a pattern that both permits viewing the protected information through it and the viewing of an authenticating image or other light pattern reconstructed from it in reflection. The same master hologram or diffraction grating is made into distinct authenticaton devices by forming replicas thereof that have different patterns of reflective material which form distinct indicia, such as a different alpha-numeric character.

5 Claims, 3 Drawing Sheets

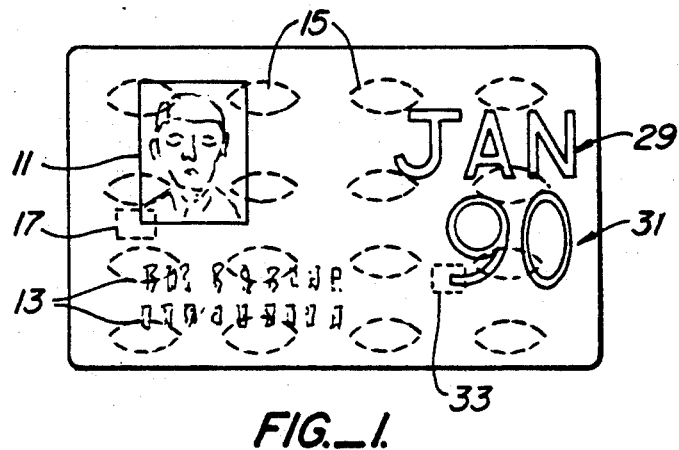
FIG._1.
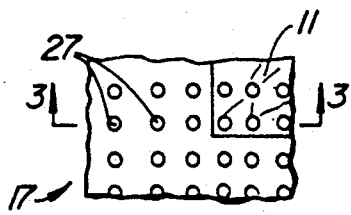
FIG._2.
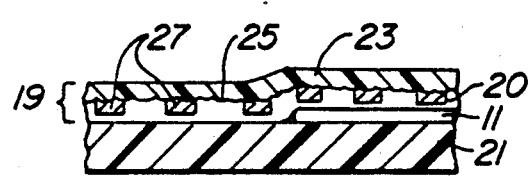
FIG._3.
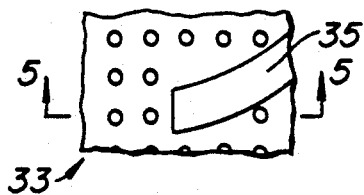
FIG._4.
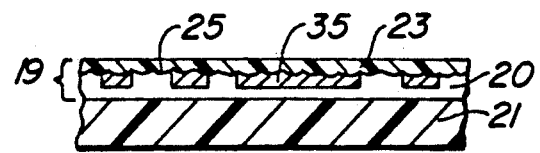
FIG._5.

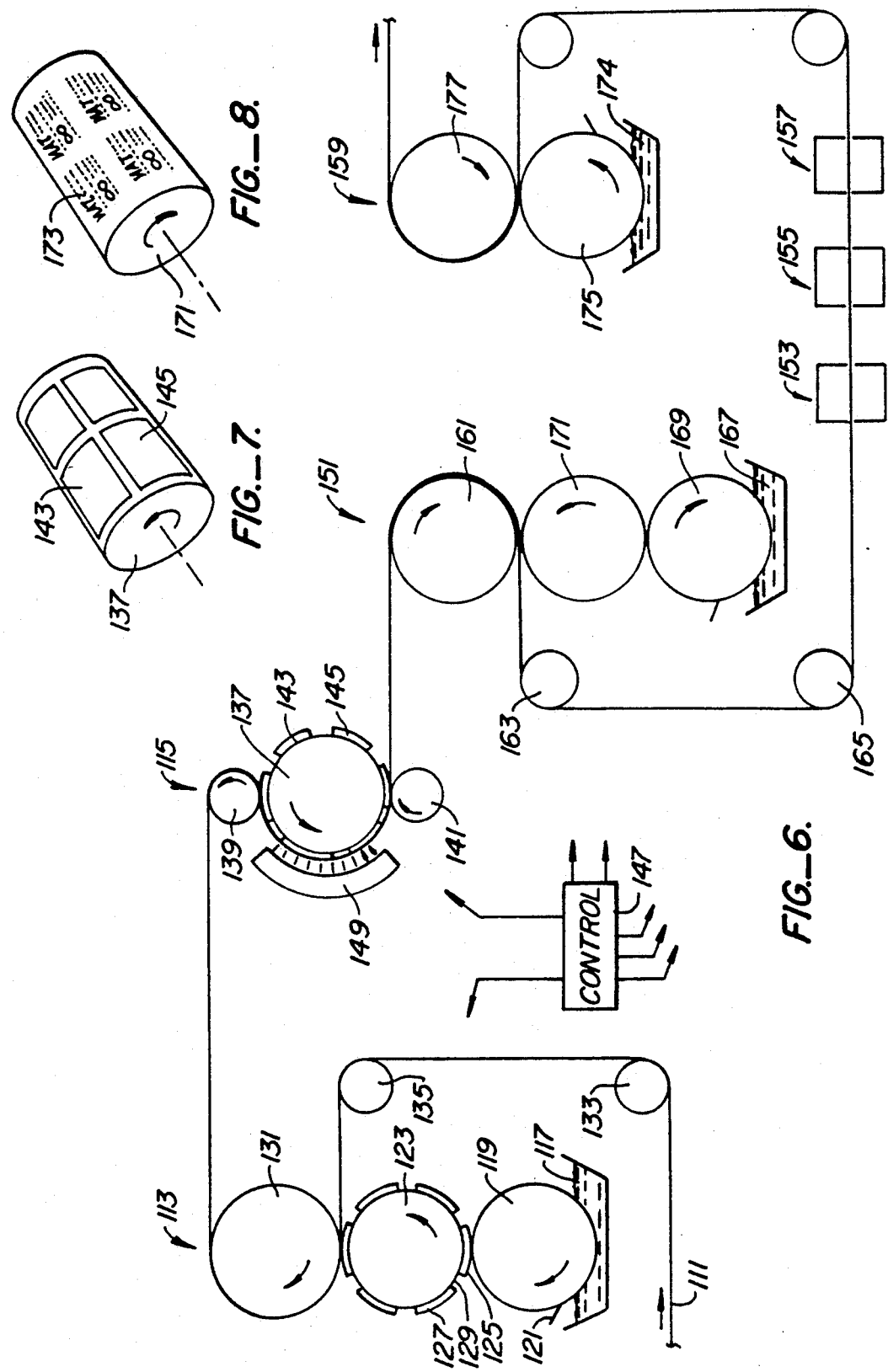

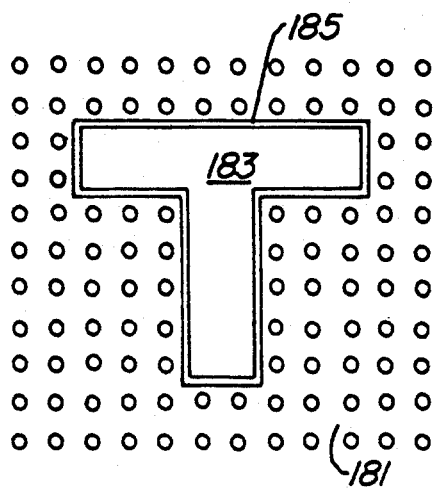
FIG._10.
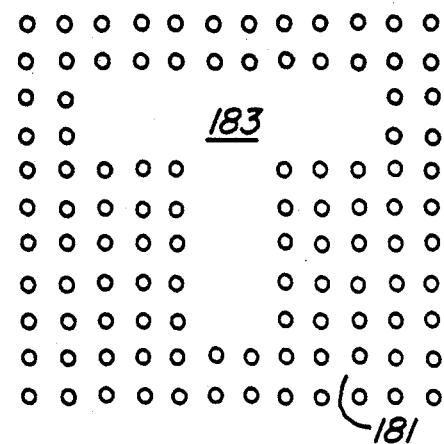
FIG._9.
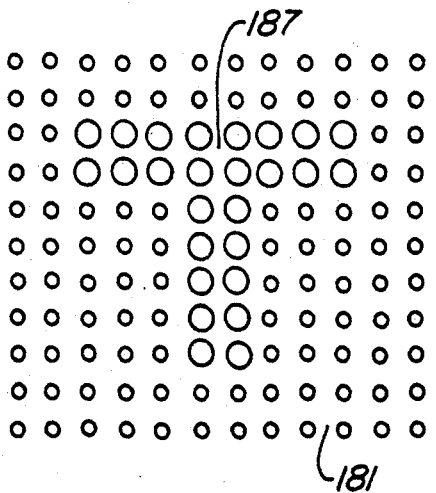
FIG._11.
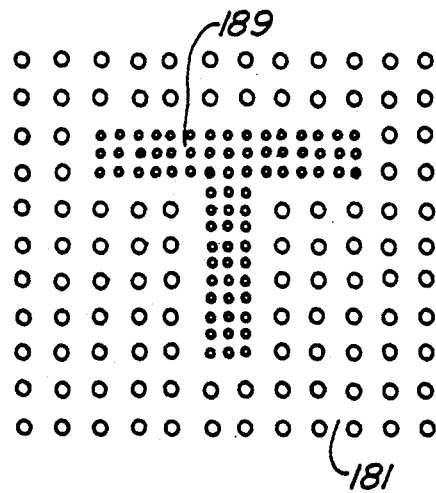
FIG._12.

HOLOGRAMS WITH DISCONTINUOUS METALLIZATION INCLUDING ALPHA-NUMERIC SHAPES

This is a division of application Ser. No. 470,121, filed Jan. 25, 1990, which issued as U.S. Pat. No. 5,044,707, on Sep. 3, 1991.

CROSS-REFERENCE TO RELATED APPLICATIONS

This is related to Application Ser. No. 07/291,247, filed Dec. 23, 1988, which is a continuation-in-part of application Ser. No. 07/160,641, filed Feb. 26, 1988, now abandoned, and which in turn is a continuation-in-part of application Ser. No. 07/156,305, filed Feb. 12, 1988, now abandoned. A corresponding European Pat. Application No. 89102182.6 was published Aug. 16, 1989 as No. 328,086, and is incorporated herein by this reference.

BACKGROUND OF THE INVENTION

This invention relates generally to the optical arts of holography and diffraction gratings, and more particularly, to a special forms of these optical devices for use in authenticating documents and other items as genuine.

There is a wide-spread need to authenticate written information and articles in order to prevent both the counterfeiting of the article and an alteration of a genuine article. Examples of such articles include credit cards, identification cards, driver's licenses, transit passes, passports, stock certificates, and the like. Holograms are currently being extensively used on credit cards and transit passes, for example. An image having observable three-dimensional characteristics is viewable in light reflected from such a hologram.

Because holograms are difficult to make and require a high level of technical sophistication, the difficulty of making a counterfeit credit card, or other article to which a hologram is attached, is increased. A master hologram is made in an optical laboratory with coherent light. The resulting master hologram is capable of reconstructing an image of the object from which it is made. Low-cost replicas are then made from that master. Several specific replication techniques are known, the most common currently being to make the master in a manner that the object information is stored in a surface relief pattern. This surface relief pattern is then used to make replicas by an embossing or casting operation. A layer of reflective material is applied to each replica surface relief pattern so that the image may be viewed in light reflected from that pattern. The holograms are then firmly attached to the credit card or other article to be authenticated. The hologram is also constructed of suitable materials so that an attempt to remove the hologram from the article will destroy it, thereby eliminating the possibility of a counterfeiter transferring a hologram from a genuine article and onto a counterfeit article.

An authenticating hologram of this type cannot cover printing, photographs and the like carried by the article to be authenticated when that information wants to be viewed. This is because the reflective layer of the hologram is substantially opaque so that any visual information on the article in the area to which it is attached is covered by the hologram. Some credit cards are authenticating some of the raised alpha-numeric information on them by covering at least a few of the characters with the hologram. But any printing, photographs or the like on a flat surface under the hologram is not viewable.

There has been some effort to control the amount of reflective material that is applied to the surface relief hologram so that it will both reflect enough light in order to reconstruct an image recorded in the hologram and at the same time be transparent enough to make visible any printing, photograph or other visual information under the hologram. Besides authenticating the article to which the hologram is attached and the visual information under it, such a hologram has the potential of preventing alteration of that information on an authentic article. It has been found to be very difficult, however, to be able to repeatedly form a reflective layer on the hologram that gives it these advantageous characteristics. Aluminum is usually employed as the reflective material. A proper thickness of that layer can result in the desired partial transparency and partial reflection, but the processes used to date have been very difficult to control in order to provide the proper thickness.

Holograms are also being used to authenticate documents, such as transit passes, that are reissued at frequent periodic intervals, such as monthly. It is often desired that the hologram be changed each month so that transit authorities can easily recognize a valid current transit pass from an expired one. This presently requires making a new optical master hologram for each new pass, an expensive and time consuming process.

Therefore, it is a specific object of the present invention to provide an improved hologram or diffraction grating for attaching to a document or article over visual information that is to be protected, wherein the information can be observed through the hologram and an image reconstructed from the hologram may be observed.

It is another object of the present invention to provide an authentication hologram or diffraction grating, and process for making it, that allows easy modification for monthly transit passes and the like without having to make a new optical master.

It is a more general object of the present invention to provide novel holograms and diffraction gratings for authentication of documents and other articles.

SUMMARY OF THE INVENTION

These and additional objects are accomplished by the articles and processes of the present invention, wherein, briefly, a continuous hologram or diffraction grating device is provided from which an image or other recognizable pattern is reconstructed in light reflected from the device but light reflective material is discontinuously provided in distinctive shapes such as one or more alpha-numeric characters. The reflective material pattern can thus be selected to convey information which is independent of that recorded on the hologram or diffraction grating. In the case of transit passes discussed above, for example, the same hologram or diffraction grating can be used for each month's pass, the pattern of reflective material clearly indicating the current month for which the pass is valid. This technique is optimally combined with a noncontinuously reflective hologram or diffraction pattern that covers information on a substrate to be protected but the technique can also be used as part of an otherwise solid hologram that is attached to a substrate along side information desired to be visible.

Additional objects, advantages and features of the various aspects of the present invention will become apparent from the following description of the preferred embodiments thereof, which description should be taken in conjunction with the accompanying drawings.

BRIEF DESCRIPTION OF THE DRAWINGS

FIG. 1 illustrates an article having visual information that is protected by an improved hologram of the present invention being attached thereto;

FIG. 2 is an expanded view of a portion of the protected article of FIG. 1;

FIG. 3 is a cross-sectional view of the structure of FIG. 2 taken across section 3—3 thereof;

FIG. 4 is an expanded view of another portion of the protected article of FIG. 1;

FIG. 5 is a cross-sectional view of the structure of FIG. 4, taken across section 5—5 thereof;

FIG. 6 illustrates a continuous process for making a hologram or diffraction grating of a type used to authenticate an article, such as shown in FIG. 1;

FIGS. 7 and 8 show individual components used in the process of FIG. 6; and

FIGS. 9-12 shows some alternative structures of a hologram or diffraction grating made according to the process illustrated in FIGS. 6-8.

DESCRIPTION OF THE PREFERRED EMBODIMENTS

Referring initially to FIG. 1, an example is given of an article having a protective hologram attached that utilizes the present invention. A document, such as a passport, driver's license, personal identification card, transit pass, or the like, includes a photograph 11 of the bearer. Written information 13 of the bearer is also provided on the surface of the document. The document can be paper, plastic or some other material that contains visual information to be protected from alteration. Covering at least the photograph 11 and the written information 13 is a see-through hologram authentication device of a type discussed in the patent applications cross-referenced above. Such a hologram reconstructs in reflected light images recorded in it, such as reconstructed images 15. Thus, the information 11 and 13 to be protected is covered with a hologram that allows the information to be observed through it at the same time as allowing the authenticating reconstructed images 15 to be observed.

A small area 17 of FIG. 1 is expanded in FIG. 2. FIG. 3 shows a sectional view through the expanded portion of FIG. 2. A hologram 19 is attached to a substrate 21 by an appropriate adhesive layer 20. The hologram 19 includes a substantially clear plastic film 23 having a surface relief pattern 25 formed on an inside surface thereof. The surface relief pattern 25 is continuous across at least a defined area of the hologram 19, continuing over the entire hologram in this example and thus the entire protected document. The surface relief pattern is formed from a master hologram by a standard embossing or casting technique.

That portion of the surface relief pattern 25 to which a reflective layer is attached will be operative in reflecting incident light into the recorded image or other light pattern. In the hologram portion illustrated in FIGS. 2 and 3, reflective aluminum dots 27 are periodically spaced across the surface relief pattern 25 and attached to it in a manner to follow its contours. As described in considerably more detail in the applications cross-referenced above, this allows an image to be reconstructed from the hologram 19 in reflected light at the same time as the photograph 11 and other information attached through the substrate 21 is viewed through the hologram. The opaque, reflective dots 27 are made of a size and spaced apart sufficient for this to occur.

In addition to the reflective dots, the opaque metallization of the hologram surface relief pattern in the embodiment of FIG. 1 is configured over an area of the protected document not covering the photograph 11 or other information 13 to provide a unique indicia that is separate, independent and unregistered from the images 15 reconstructed from the hologram. The indicia formed by the hologram metallization pattern is also separate and independent from the document information 11 and 13 being protected. In this case, that indicia is alphanumeric information, namely a month 29 and a year 31. The information or visual design of the protected document itself can also be changed each time that the hologram metallization pattern characters are changed but this technique allows use of other copies of the same document without change, if desired, for economics and simplicity.

FIG. 4 shows an expanded view of another small area 33 of the protected document of FIG. 1. This includes a portion 35 of the "nine" of the year 31 that is visible from the face of the protected document of FIG. 1. The number is formed by the shape of the reflective metallization layer that is applied to the surface relief pattern 25. The region 33 shown in FIG. 4 illustrates that metallization pattern to retain the reflective dots around it. The metallization 35 also provides a reflective backing for reconstructing an image from the hologram surface relief pattern 25 covered by it.

This information can be a month and year of expiration of the protected document, of a month during which the protected document is valid, and the like. In such cases, new documents need to be issued periodically and it is quite expensive if an entirely new protective hologram needs to be constructed for use with each document reissue. What is most expensive is the making of an optical master hologram. But the technique of adding the indicia 29, 31 in a metallization step allows the same authenticating hologram to be utilized in successive reissues of the document since the metallization step occurs after the hologram replication step. A large number of such protective holograms can be manufactured for inventory with limited amounts periodically withdrawn and metallized with unique indicia 29, 31, but it generally is preferable to replicate each new issue of the protective hologram from the beginning. This still utilizes the same master hologram replicating plates for each issue, only the pattern of metallization changing. No new optical hologram master need be made.

Such a technique is illustrated generally in FIGS. 6-8. FIG. 6 illustrates the process steps for forming hologram replicas on a continuous length of flexible substrate material 111. There are several distinct processing stages through which the web 111 passes. A first stage 113 applies liquid resin to defined areas of the web 111. Solidified, surface relief holograms are formed at station 115 in these resin areas. Next, the web proceeds to a station 151 that prints a liquid onto the surface of the replica holograms in regions where reflective material is not to be attached. A next station 153 applies a reflective metal layer over the entire hologram replica surface relief pattern. A station 155 then removes the metallization layer from those areas that were printed at station 151 with a liquid material. Next, at station 157, the process web is dried and, at an optional station 159, a protective coating and/or adhesive layer is placed on the metallized surface relief pattern.

Details of the hologram replica casting stations 113 and 115 can be had from copending Patent Application Ser. No. 399,812, filed Aug. 09, 1989, now U.S. Pat. No. 5,083,856 issued Jan. 28, 1992, the disclosure of which is incorporated herein by this reference. Briefly, a liquid bath 117 of casting resin has a first cylindrical roller 119 rotating about its axis through the liquid. The roller 119 transfers such liquid to outward surfaces of pads, such as pads 125 and 127, that are attached to an otherwise smooth cylindrical surface 123 of a drum shaped roller 123.

A third roller 131 in the station 113 guides the web 111 in a path that results in contact between the pad surfaces of the roller 123 and the web without any relative motion therebetween. Guide rollers 133 and 135 also determine the paths of the web 111. Thus, liquid resin is applied from the bath 117 to discreet areas of the web 111 as defined by the size and pattern of the pads carried by the roller 123.

After leaving the station 113, the web 111 is passed in contact with the outside of the cylindrical drum 137 by appropriate guide rollers 139 and 141, in the second work station 115. The drum 137 has a plurality of individual hologram masters, such as pieces 143 and 145, attached to its outside surface. This arrangement is further shown in FIG. 7. These hologram master pieces are arranged essentially in the same pattern as the pads of the drum 123. Rotation of the drums in the work stations 113 and 115 is coordinated by a master control 147 to cause the individual hologram pieces 143, 145, etc. to contact areas of the web 111 that have been coated with liquid resin by the pads 125, 127, etc.

The web 111 and the hologram masters attached to the outside surface of the drum 137 move together without any motion between them. Liquid resin is held between each of the surface relief master holograms 143, 145, etc. and the web. While being so held, the liquid resin is hardened by curing with actinic radiation. A source 149 of such radiation directs it through the web 111 to the trapped liquid resin. By the time a point on the web has advanced to the position of the roller 141, the liquid resin has been cured with the desired surface relief pattern formed therein. The web 111 is separated from the hologram masters 143, 145, etc. at this point and proceeds to a next work station 151.

The station 151 then coats each of the hologram replicas with a liquid material in a pattern of the desired non-continuous reflective metallization layer on the completed hologram. The web is directed around a drum shaped roller 161 and is guided away from it by rollers 163 and 165. A bath 167 of the liquid to be printed onto the hologram replicas is a water soluble resin, such as polyvinyl alcohol. This liquid is transferred by a roller 169 to the outer surface of a roller 171 which is urged into contact with the web against the roller 161. As can be seen from FIG. 8, a cylindrical surface of the printing drum 171 contains a pattern 173 that corresponds with the desired pattern of metallization on the resulting hologram replica shown in FIG. 1. In this case, the pattern 173 for a single hologram is constructed so that the liquid 167 is applied to all areas of the cast hologram relief pattern except for the regions of the desired metallization pattern 173. That is because the water soluble resin being applied will, in a subsequent step, simply be washed away and thus will remove any reflective material from the areas where the resin has been printed. The roller 171 is preferably formed from a gravure cylinder having liquid containing holes formed in a negative of the desired metallization pattern for the hologram replicas.

After application of the water soluble resin at the work station 151, the web 111 proceeds to a station 153 that coats the entire web on its side where the holograms are formed with an opaque, reflective material layer. That layer is preferably made of aluminum and the work station 153 is preferably a standard vacuum metallization machine.

Next, the web 111 advances to a station 155 which submerses the metallized hologram replicas in a water bath. The metal layer is sufficiently porous to allow water to penetrate through to the resin, thereby causing the resin applied at the station 151 to dissolve and the aluminum layer coated on such a resin to then be washed away. The next work station 157 simply dries the web by use of heat lamps and the like. Specific techniques and materials for use in the non-continuous metallization process of stations 151, 153, 155 and 157 are given in U.S. Pat. Nos. 3,935,334 - Narui et al. (1976) and 4,242,378 - Arai (1980).

As an alternative to using a water soluble resin, a resin soluble in any one of a wide variety of organic solvents can be printed onto the web 111 prior to metallization. The metal layer is then removed in the pattern of the resin by submersing the coated web into a bath of the appropriate organic solvent.

A final, optional work station 159 uniformly coats the metallized hologram replicas of the web 111 with a protective or adhesive layer from a liquid 174. A transfer roller 175 carries the liquid to the web 111 surface. The web 111 is guided by another roller 177. After an appropriate drying step, the metallized hologram replicas have such a desired additional layer. The web is then ready for separation into individual holograms by die cutting and the like for attachment to a document or other substrate surface to be protected. If it is desired to apply the individual holograms by a hot stamping process, the web 111 is then alternately attached by a hot melt adhesive to a flexible plastic carrier.

The example of the unique indicia 29, 31 (FIG. 1) formed during the reflective metallization step was described to be formed of solid reflective material. It is not necessary, however, that the alphanumeric characters be solid. That is only one of many specific implementations. Four additional specific implements are illustrated in FIGS. 9-12 for representing the letter "T" in the pattern of aluminization.

Referring initially to FIG. 9, a regular pattern of metallized dots 181 exists on the surface relief hologram replica. The letter "T" is formed by omitting dots in the region 183. This technique works well in cases where the size of the individual dots and the density of the background pattern 181 are clearly visible. The dot pattern can be made to be practically invisible to the ordinary user but still reconstruct holographic images, but in the case of FIG. 9, such an invisible pattern of dots is not workable. The example of FIG. 9 has an advantage of being able to place the "T" character 183 over information to be protected, such as the photograph 11 or writing 13 (FIG. 1), if desired, since none of the protected document is blocked by it.

FIG. 10 is an example similar to FIG. 9 except that the region 183 without a dot pattern is outlined in a thin continuous metal pattern 185. This makes the letter "T" highly visible, even when the individual dots of the background pattern 181 may not be very visible, but does so without blocking view of much area of an underlying document to which the hologram is attached.

FIGS. 11 and 12 utilize the fact of a background pattern 181 of dots clearly visible. The letter "T" is formed in FIG. 11 by a pattern 187 of reflective dots that are larger than those of the regular background pattern 181. The pattern of the dots 187 is the same as that of the background dots 181 but they are more dense and thus the pattern is distinguishable from the background. The pattern 189 in FIG. 12 is made to be different from the background pattern 181, and distinguishable because of that feature. The density of the area covered by dots in the pattern 189 may be the same as that of the background pattern 181.

The examples described above result in the making of a large number of hologram replicas with the same alpha-numeric characters formed in the metal layer of each. Alternatively, these characters can be formed by use of a printing technique that places a unique pattern on each hologram replica. This is useful, for example, where each hologram replica of a large batch of replicas is to carry a unique identifying serial number that is clearly visible in the metal layer. This can be accomplished by jet or laser printing techniques, by use of a mechanically indexed print head included as part of the drum 171, etc., to form a soluble layer pattern that is somewhat different for each replica.

Although the various aspects of the present invention have been described with respect to their preferred embodiments, it will be understood that the invention is entitled to protection within the full scope of the appended claims.

It is claimed:

1. At least first and second documents having visual information thereon protected from alteration, comprising:
    first and second hologram or diffraction grating devices that are respectively firmly attached to said first and second documents over at least a portion of the visual information carried by each,
    said first and second devices having substantially the same continuous surface relief pattern formed in a substantially transparent layer and containing information of substantially the same light image, and a discontinuous pattern of substantially completely reflective material provided behind said surface relief pattern, said discontinuous pattern being arranged so that the device, when illuminated with light, allows viewing of both the visual information on the document and an immage reconstructed from portions of said surface relief pattern containing reflective material,
    the reflective material of the first device additionally being arranged to form at least a first indicia that is visually distinct from that of the device light image or document visual information, and
    the reflective material of the second device additionally being arranged to form at least a second indicia that is visually distinct from that of the device light image or document visual information, said first and second indicia also being visually distinct from each other.

2. The arrangement of claim 1 wherein the visual information on each of the first and second documents is substantially the same.

3. The arrangement of claim 1 wherein the first and second distinctive indicia each include at least one alpha-numeric character different from the other.

4. At least first and second hologram or light diffraction devices formed from replicas of a light interference pattern recorded as a common surface relief pattern on one side of a substantially transparent sheet, wherein said first device includes a pattern of discontinuous substantially opaque reflective material conforming to a first replica of said common surface relief pattern and arranged to include a first indicia, and wherein said second device includes a pattern of discontinuous substantially opaque reflective material conforming to a second replica of said common surface relief pattern and arranged to include a second indicia visually distinct from the first indicia, whereby said first and second devices can be efficiently made from a single surface relief pattern but yet be visually distinct.

5. A method of making at least two visually distinct hologram or diffraction devices from a common surface relief master pattern, comprising the steps of:
    forming at least first and second replicas of the common surface relief pattern on one side of each of first and second sheets of substantially optically clear material,
    forming a first non-continuous, substantially opaque reflective layer conforming to the surface reflief pattern of the first replica and with a visible pattern that contains a first indicia, thereby forming a first device, and
    forming a second non-continuous, substantially opaque reflective layer conforming to the surface relief pattern of the second replica and with a visible pattern that contains a second indicia that is visually distinct from said first indicia, thereby forming a second device,
    whereby said first and second devices can be efficiently made from a single surface relief master pattern but yet be visually distinct.

* * * * *

UNITED STATES PATENT AND TRADEMARK OFFICE
CERTIFICATE OF CORRECTION

PATENT NO.    :    5,142,383
DATED         :    August 25, 1992
INVENTOR(S)   :    Donald W. Mallik It is certified that error appears in the above-identified patent and that said Letters Patent is hereby corrected as shown below:

Column 8, line 1, in Claim 1        replace "immage"

with        ---image---

Signed and Sealed this

Sixteenth Day of November, 1993

*Attest:*

BRUCE LEHMAN

*Attesting Officer*    *Commissioner of Patents and Trademarks*